US010570658B2

(12) United States Patent
Mirzeabasov et al.

(10) Patent No.: US 10,570,658 B2
(45) Date of Patent: Feb. 25, 2020

(54) FIRE-BLAST RESISTANT WINDOW ASSEMBLY AND METHODS FOR INSTALLING THE SAME

(71) Applicants: Timur Akhmedbekovich Mirzeabasov, Saint Petersburg (RU); Dmitriy Olegovich Belov, Saint Petersburg (RU)

(72) Inventors: Timur Akhmedbekovich Mirzeabasov, Saint Petersburg (RU); Dmitriy Olegovich Belov, Saint Petersburg (RU)

( * ) Notice: Subject to any disclaimer, the term of this patent is extended or adjusted under 35 U.S.C. 154(b) by 0 days.

(21) Appl. No.: 15/758,123

(22) PCT Filed: Sep. 6, 2016

(86) PCT No.: PCT/RU2016/000608

§ 371 (c)(1),
(2) Date: Mar. 7, 2018

(87) PCT Pub. No.: WO2017/044006

PCT Pub. Date: Mar. 16, 2017

(65) Prior Publication Data

US 2018/0245399 A1 Aug. 30, 2018

(30) Foreign Application Priority Data

Sep. 7, 2015 (RU) ................................ 2015138012

(51) Int. Cl.
*E06B 5/16* (2006.01)
*E06B 5/12* (2006.01)
(Continued)

(52) U.S. Cl.
CPC ................ *E06B 5/165* (2013.01); *E06B 3/12* (2013.01); *E06B 5/12* (2013.01); *B32B 17/069* (2013.01);
(Continued)

(58) Field of Classification Search
CPC ... E06B 1/52; E06B 5/00; E06B 5/165; E06B 5/125; E06B 5/12; E06B 5/106;
(Continued)

(56) References Cited

U.S. PATENT DOCUMENTS 3,203,053 A * 8/1965 Lane .................. E06B 3/26307 49/489.1
3,711,995 A * 1/1973 Anderson ................ E06B 1/32 49/504

(Continued)

FOREIGN PATENT DOCUMENTS

| | | | |
|---|---|---|---|
| EA | 201270306 | A1 | 7/2012 |
| EP | 0288518 | B1 | 7/1991 |
| RU | 2108434 | C1 | 4/1998 |

*Primary Examiner* — Ryan D Kwiecinski
*Assistant Examiner* — Matthew J Gitlin
(74) *Attorney, Agent, or Firm* — Arent Fox LLP; Michael Fainberg

(57) ABSTRACT

The invention relates to a fire and blast resistant window assembly, comprising a frame adapted to be built into a window aperture, a glazing system and a front insulating glass unit. The assembly is characterized in that the front insulating glass unit is mounted on the frame such that a thermal break is formed therebetween, the frame contains a metal framework, which delimits a mounting aperture for the glazing system, wherein separator plates are welded to the framework, along the perimeter thereof, with spaces between the separator plates, and the glazing system comprises a first and a second glazing unit. Each of the glazing units comprises a support profile and a glazing sheet, which is inserted in the support profile and clamped thereto from the inside by glazing beads, wherein a thermal break is formed therebetween.

7 Claims, 2 Drawing Sheets

6
5
8'
7'
9
10
8
7
12
1
4
2
3
16
15
13
14

(51) Int. Cl.

| | |
|---|---|
| ***E06B 3/12*** | (2006.01) |
| *B32B 17/10* | (2006.01) |
| *B32B 17/06* | (2006.01) |
| *F41H 5/04* | (2006.01) |

(52) U.S. Cl.
CPC ...... *B32B 17/10036* (2013.01); *F41H 5/0407* (2013.01)

(58) Field of Classification Search
CPC ..... E06B 3/16; E06B 3/12; E06B 3/28; E06B 9/02; E06B 2009/005; F41H 5/0407; B32B 17/10036; B32B 17/10311; B32B 17/069; B32B 17/10302
See application file for complete search history.

(56) References Cited

U.S. PATENT DOCUMENTS

| | | | | | |
|---|---|---|---|---|---|
| 3,905,154 | A * | 9/1975 | Anderson | E06B 1/32 49/161 |
| 3,935,681 | A * | 2/1976 | Voiturier | B32B 17/10045 52/1 |
| 3,997,700 | A * | 12/1976 | Jacquemin | B32B 17/10036 428/332 |
| 4,027,443 | A | 6/1977 | Briggs | |
| 4,048,978 | A * | 9/1977 | Plumat | C03C 17/06 126/200 |
| 4,115,973 | A * | 9/1978 | Anderson | E06B 1/32 428/542.8 |
| 4,174,207 | A * | 11/1979 | Gagne | C03B 18/18 65/182.1 |
| 4,563,849 | A * | 1/1986 | Mangal | E04B 2/88 52/235 |
| 4,796,404 | A * | 1/1989 | Butler | E04B 1/76 52/786.11 |
| 4,831,804 | A * | 5/1989 | Sayer | E06B 3/222 52/204.593 |
| 5,603,585 | A * | 2/1997 | Bruchu | B29C 65/20 403/382 |
| 5,657,591 | A * | 8/1997 | Kitada | E06B 3/5454 49/501 |
| 5,713,167 | A * | 2/1998 | Durham | E06B 1/345 52/204.54 |
| 6,041,552 | A * | 3/2000 | Lindahl | E05D 15/06 49/458 |
| 2003/0208970 | A1 | 11/2003 | Saelzer | |
| 2005/0284046 | A1* | 12/2005 | Neal | E06B 1/36 52/204.5 |
| 2006/0248833 | A1* | 11/2006 | Autovino | E06B 3/72 52/455 |
| 2009/0313941 | A1* | 12/2009 | Siodla | E06B 3/26303 52/800.13 |
| 2011/0192328 | A1 | 8/2011 | Frest et al. | |
| 2015/0345208 | A1* | 12/2015 | Boulanger | E06B 3/6612 428/34 |
| 2016/0340586 | A1* | 11/2016 | Auth | C09K 21/02 |
| 2017/0350186 | A1* | 12/2017 | Philips | E06B 3/26301 |

* cited by examiner

FIRE-BLAST RESISTANT WINDOW ASSEMBLY AND METHODS FOR INSTALLING THE SAME

CROSS-REFERENCE TO RELATED APPLICATIONS

This application is a National Stage of International Application No. PCT/RU2016/000608, filed Sep. 6, 2016, which claims priority to Russian Patent Application No. 20150138012, filed Sep. 7, 2015, both of which are hereby incorporated by reference in their entireties.

FIELD OF THE INVENTION

The present invention relates to fire-blast resistant assemblies and, in particular, to a fire-blast resistant window assembly for protecting window openings in industrial and specialized facilities against the effects of air blast and open fire, as well as to methods for installing said fire-blast resistant assembly in a window opening.

DESCRIPTION OF THE RELATED ART

Known from the prior art is document EP 0288518 B1 (published on Aug. 7, 1991) describing a fire-proof window assembly preferably comprising three units that consist of heat-resistant borosilicate glass, and a metallic holding frame coated with a fire-resistive paint.

This technical solution characterized by manufacturing the window assembly components from materials able to prevent the fire from spreading, allows to resist the affecting factors of the fire, and to ensure the compliance of said window assembly with specified fire-resistance ratings. However, said window assembly is not able to withstand the effective effects of the explosion.

In order to solve the problem of withstanding the effects of the explosive blast by restraining and retarding the blast effects, document US 20030208970 (published on Nov. 13, 2013) proposes to use blast-resistant structure which, for example, can be a door or a window. A mounting part of this structure is received in a space between two counter-support surfaces formed by a U-channel or opposite L-members that protrude perpendicularly to frame surface defining the opening in the wall. A U-sectional profiled member is arranged in said channel and has mounting brackets or plates distributed in the longitudinal direction and welded to this member. Said mounting brackets or plates, in turn, are anchored to the masonry wall by means of bolted connections, the bolts of which extend perpendicularly to the surfaces defining the opening. On one or both sides, a respective damping element is interposed between the mounting part and respective adjacent counter-support surface. The damping element may be a plastically deformable metallic strip. When an explosion force acts on the structure, the damping element is first plastically deformed to absorb energy, before the remaining force is transmitted into the building wall. The two damping elements on opposite sides damp forces from pressure waves of the explosion.

The technical solution described in US 20030208970 B2 is the closest prior art to the present invention and is chosen as its prototype. However, said known structure has the following serious shortcomings. When the known structure is affected by the explosive blast, the developed excessive pressure, in bolted connections anchoring the mounting brackets or plates to the wall with the opening, causes shearing and collapsing transverse stresses critical for such point anchorages. This leads to essential decreasing of blast resistance of the structure installed in the window opening. Moreover, this known structure is designed for protecting against the blast affective factors, the major one being the excessive pressure of the air blast, but not for protecting against the affective factors of fire, the major one being the thermal radiation.

Therefore, there is a need for providing a fire-blast resistant window assembly that would eliminate the drawbacks of the prior art and ensure the protection both against the blast affective factors and the affective factors of the fire, as well as for providing simple and effective methods for installing such a fire-resistant window assembly in the window opening so that its fire and blast resistance properties are improved.

SUMMARY OF THE INVENTION

The object of the present invention is to provide a window assembly that exhibits both fire resistance and blast resistance properties, and to provide simple and effective method for installing said assembly in the window opening so as to improve the fire-blast resistance properties of the window assembly.

The technical result, achievable by the present invention, consists in enhancing the reliability degree and resistance of the window assembly to the effects of the explosive blast, and in ensuring fire resistance of said assembly for a long period of time, including after air-blast action. Moreover, by implementing the methods for installing the fire-blast resistant window assembly according to the present invention it is possible to improve the fire and blast resistance properties of the assembly.

The task indicated in the present invention, as regards ensuring the blast resistance of the window assembly, is solved by specifically developed structural features of the glazing system, its fastening to the window sash, and fastening the sash in the window opening, while the aim of ensuring the fire resistance is achieved by using the window assembly made of refractory materials and by creating the thermal breaks.

More precisely, the specified aim is achieved due to the fact that the fire-blast resistant window assembly according to the present invention comprises a sash to be built in a window opening, a glazing system and a face multiple glass unit covering a sash from the front, and is characterized in that the face multiple glass unit is mounted on the sash so that a thermal break in the form of a thermal insulation material layer is formed therebetween; the sash comprises a metallic framework with a face part and a back part, that delimits, with its own surface facing inside the window opening, a mounting aperture for the glazing system, wherein metallic separating plates are welded to the face part of the framework, along the perimeter of said mounting aperture, so as to provide spacings therebetween; and the glazing system contains a first and a second glazing unit.

The first glazing unit is installed in said mounting aperture in the face part of the sash framework as a fixed leaf, and comprises a metallic support contour made of an angular profile, wherein one of the profile flanges is welded to said separating plates and is directed inwards the room, while the other profile flange protrudes inside the mounting aperture, thereby forming a support lug; a first glazing sheet inserted from the back side of the support contour so that it abuts against said support lug, and metallic glazing beads fastened from the back side of the first glazing sheet by means of bolted connections to the profile flange welded to the separating plates so that the first glazing sheet is pressed to said support lug, wherein a layer of the refractory material is interposed between the first glazing sheet and adjoining thereto surfaces of the support lug and of the glazing beads of the first glazing unit, wherein said layer forms a thermal break therebetween.

The second glazing unit, in turn, is installed in said mounting aperture in the back part of the sash framework and comprises a metallic support contour made of an angular profile, wherein one of the profile flanges protrudes inside the mounting aperture, thereby creating a support lug; a second glazing sheet inserted with an abutment in said support lug, and metallic glazing beads pressing the second glazing sheet to said support contour, that are similar to the ones provided in the first glazing sheet, wherein a layer of the refractory material is interposed between the second glazing sheet and adjoining thereto surfaces of the support contour and of the glazing beads of the second glazing unit, wherein said layer forms a thermal break therebetween, and the support contour of the second glazing unit is fastened to the sash framework by means of bolted connections so as to obtain a sealing between the sash and the second glazing unit.

In a preferred embodiment of the present invention, the refractory material in glazing units is mullite silica cardboard. The usage of the refractory material as described above improves fire safety of the window assembly.

In a preferred embodiment of the present invention the support contour of the second glazing unit is fastened to the sash framework using an additional separating element that is a metallic contour made of an angular profile enveloping the corner of the sash framework from its back side, so that one of the profile flanges of said separating element is interposed between the support contour of the second glazing unit and the sash framework.

Also, in a preferred embodiment of the present invention the first and the second glazing sheets are made of multiple-layered glass, and the sash framework and the glazing beads in the glazing units are made of pipe sections with rectangular cross-section.

The indicated task in regards of providing simple and effective method for installing the window assembly as described above in a window opening and enhancing the fire and blast resistance properties of said assembly is solved by a method for installing the window assembly in the window opening which has a groove with a metal casing provided along its perimeter, said method comprising the following steps: inserting a metallic clamping frame in said groove so that its part protrudes inside the window opening; welding a metallic support element to the back part of the sash framework of the window assembly, from the framework side facing the walls of the window opening; installing the window assembly into the window opening so that said support element abuts against the part of the clamping frame that protrudes inside the window opening, from its back side; and welding a metallic closure element to the face part of the sash framework of the window assembly, from the framework side facing the walls of the window opening so as to ensure fixation of the part of the clamping frame that protrudes inside the window opening, between said support and closure elements, wherein a layer of refractory material is interposed between the protruding part of the clamping frame and adjoining thereto surfaces of the window assembly and of said support and closure elements, wherein said layer forms a thermal break therebetween.

In a preferred embodiment said support and closure metallic elements, as well as the clamping frame are made of the pipe sections with rectangular cross-section. By making the elements of the window assembly from the hollow pipe members it is not only possible to reduce the weight of the assembly, but also to.

Therefore, the set of essential features of the present invention in each of its embodiments, described above and specified in the independent claims of the invention, allows the mentioned technical result to be achieved.

BRIEF DESCRIPTION OF THE DRAWINGS

The advantages of the present invention will be better understood from reading the following description of preferred embodiments thereof with reference to the appended drawings, in which.

DETAILED DESCRIPTION OF PREFERRED EMBODIMENTS OF THE INVENTION

Hereafter, with reference to the accompanying drawings described is a preferred embodiment of the fire-blast resistant window assembly according to the present invention.

Figure 1:
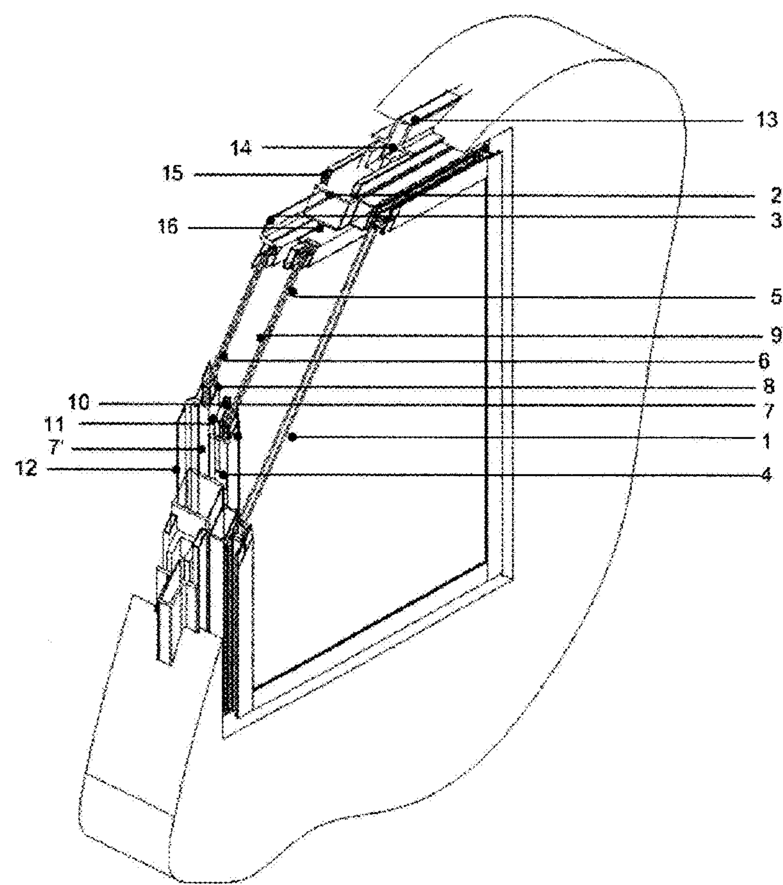
FIG. 1 shows a side view, with sections, of a fire-blast resistant window assembly installed in a window opening according to a preferred embodiment of the present invention.

FIG. 1 illustrates a side view, with a set of sections by parallel planes, of the fire-blast resistant window assembly comprising a sash (2), glazing system (5, 6) and a face multiple glass unit (1), installed so as to cover the sash from the face side. Hereinafter, by “face side” is meant a side of the window assembly or of its elements, facing outside. Consequently, by “back side” is meant a side of the window assembly or of its elements, facing the room. Said face multiple glass unit (1) being a standard multiple glass unit of any design, is installed in the sash so as to obtain therebetween a thermal break in the form of a refractory material layer for increasing the heat transfer resistance of the window assembly in normal operation. By installing the face multiple glass unit, it is possible to obtain an effective thermal and acoustic insulation and a good looking appearance essentially similar to the traditional window multiple glass unit.

Figure 2:
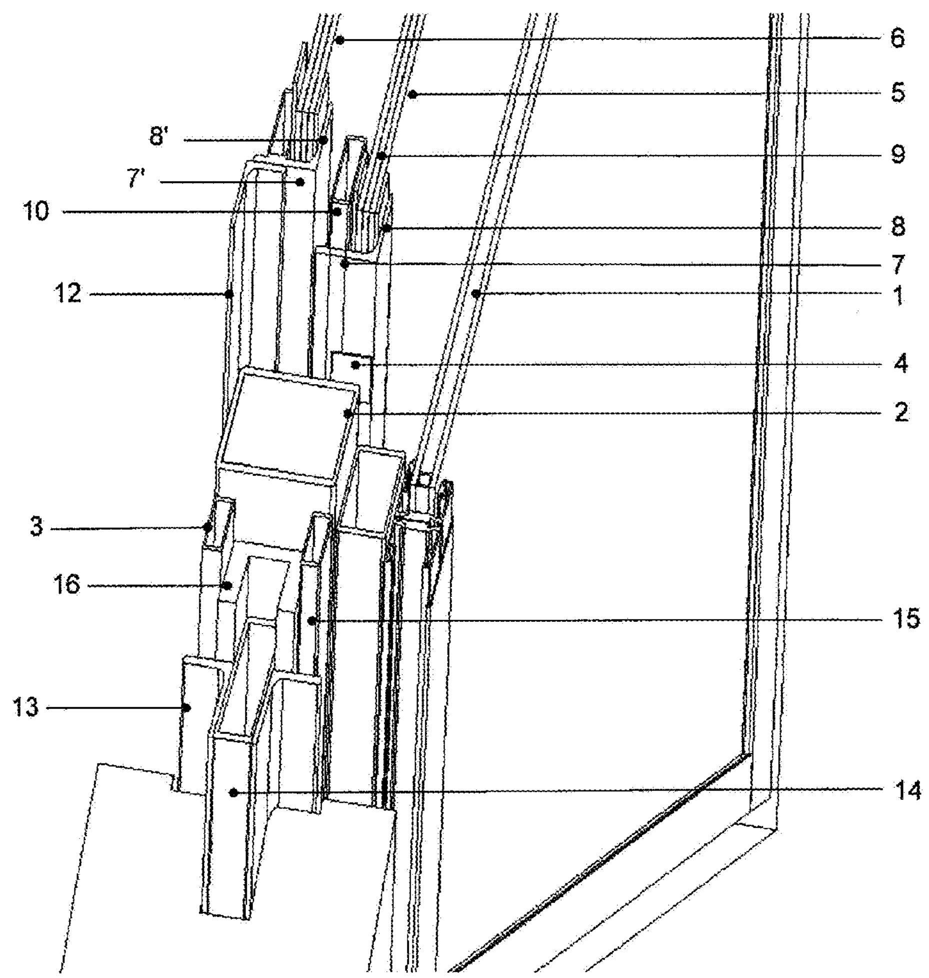
FIG. 2 shows an enlarged detail of the fire-blast resistant window assembly from FIG. 1.

Said sash of the window assembly is a monolithic metallic framework (2) having such a thickness in the cross-section that it can be conditionally divided into a face part and a back part. The surface of the framework (2), facing inside the window opening, delimits a mounting aperture for the glazing system. As shown in FIG. 1 and FIG. 2, the framework (2) is preferably welded from the pipe sections of rectangular cross-section, in order to decrease the weight of the window assembly; however, the present invention is not limited in this regard and the framework (2) may be solid or, for example, it can be made of pipe sections with nonrectangular cross-section.

As shown in FIG. 2, in the face part of the framework (2), metallic separating plates (4) are welded along the perimeter of said mounting aperture, so as to provide spacings therebetween along the inner perimeter of the framework. Hereinafter, the internal surface of the framework (2) should be understood as meaning a surface defining the mounting aperture for the glazing system. Accordingly, the external surface of the framework (2) should be understood as meaning a surface facing the end faces of the window opening wall.

In the mounting aperture formed by the framework (2), there is disposed a glazing system including a first glazing unit (5) and a second glazing unit (6). The first glazing unit (5) is installed in the face part of the sash framework (2) and comprises: a metallic support contour (7) made of an angular profile, wherein one of the profile flanges is welded to said separating plates, while the other profile flange protrudes inside the mounting aperture, thereby forming a support lug (8), a first glazing sheet (9) installed so that it abuts, along its edges, against said support lug (8) from its back side; and metallic glazing beads (10) fastened from the back side of the first glazing sheet (9) by means of bolted connections to the profile flange welded to the separating plates, so that the first glazing sheet (9) is pressed to said support lug (8). A layer of the refractory material (11), preferably of mullite silica cardboard, is interposed between the first glazing sheet (9) and adjoining thereto surfaces of the support lug (8) and of the glazing beads (10), wherein said layer forms a thermal break therebetween. It should be noted that the present invention is not limited in terms of choosing the refractory materials, and for creating the thermal breaks in the window assembly one can use any suitable refractory material or materials.

The second glazing unit (6) is installed in the back part of the sash framework (2) and comprises elements essentially similar to the ones provided in the first glazing unit: a metallic support contour (7') made of an angular profile, wherein one of the profile flanges protrudes inside the mounting aperture, thereby creating a support lug (8'), a second glazing sheet installed so that it abuts against said support lug, and metallic glazing beads pressing the second glazing sheet to said support contour. In this case a layer of the refractory material (11), preferably of mullite silica cardboard, is interposed between the second glazing sheet and adjoining thereto surfaces of the support contour (7) and of the glazing beads of the second glazing unit, wherein said layer forms a thermal break therebetween, essentially similar to the one formed in the first glazing unit (5). However, in contrast to the first glazing unit (5), the support contour (7') of the second glazing unit (6) is fastened to the sash framework (2) by means of bolted connections so as to provide a sealing between the sash (2) and the second glazing unit (6).

Moreover, in a preferred embodiment, the support contour (7') of the second glazing unit is fastened to the sash framework (2) using an additional separating element (12) that is a metallic contour made of an angular profile enveloping the corner of the sash framework from its back side so that one of the profile flanges of said separating element (12) is interposed between the support contour of the second glazing unit and the sash framework (2) as shown in FIG. 2.

The first and the second glazing sheets are comprised of blast-resistant glass. In a preferred embodiment, the first and the second glazing sheets are comprised of multi-layered glass, for example, as shown in FIG. 2, three-layered glass with a special blast-resistant interlayer between each of its layers, as a result the glass sheet not only becomes resistant to the air-blast, but also attains the fire-proof properties.

The sash framework (2), as well as the metallic glazing beads in the first (5) and the second (6) glazing units may consist of pipe sections with rectangular cross-section as shown in FIG. 2, so as to reduce the weight of the window assembly and, thus, to simplify the installation procedure thereof.

The separating plates (4) and the flange of the separating element (12), interposed between the support contour (7') of the second glazing unit (6) and the sash framework (2), preferably have the same thickness, preferably of about 10 mm, such that the same elements may be used in the first (5) and the second (6) glazing units.

Between the support contour (7) of the first glazing unit (5), welded to the separating plates (4), and the sash framework (2), holes are provided in the region of the spacings between the separating plates (4) along the mounting aperture perimeter. Said holes between the separating plates (4) along the mounting aperture perimeter provide a choke effect of the excessive pressure of the air blast. The number of used separating plates and, accordingly, the sizes and the number of said holes may vary depending on the blast resistance requirements for specific window assembly.

Let's consider in further details said choke effect of the air blast excessive pressure. When implementing the explosion scenario outside the room, the air blast, first, affects the face multiple glass unit (1) from the face side and freely destroys it. Then, a part of the excessive pressure of the air blast enters the interior of the window assembly between the first (5) and the second (6) glazing units through said holes between the separating plates and withstands, on the inside, a front force on the first glazing unit (9), which tends to bend it in the force direction. Thus, due to said attainable counter action to the part of the air blast pressure from the inside of the window assembly, the second glazing unit (6) essentially remains unexposed to the destructive effect of the air blast.

The window assembly according to the preferred embodiment of the present invention is installed as follows. Supposedly, the installation is executed into the window opening that has a groove with a metallic casing (13) provided along its inner perimeter, and if it is not provided such a groove with a casing is made, for example, using two angular profiles, as shown in FIG. 2. Next, a clamping frame (14) is inserted in said groove so that its part protrudes inside the window opening. The clamping frame (14) preferably consists of pipe sections with rectangular cross-section.

A metallic support element (3) is welded to the back side (2) of the sash framework of the window assembly, from the framework side facing the walls of the window opening, preferably by means of two continuous welded seams. The support element (3) forms a support lug along the entire perimeter of the outer surface of the framework (2) and preferably is welded from the pipe sections with the rectangular cross-section.

Then, the window assembly is installed by inserting it into the window opening from the room side so that said support element (3) of the assembly abuts against the part of the clamping frame (14), protruding inside the window opening, and the metallic closure element (15) is welded to the face part of the sash framework (2) of the window assembly, from the framework side facing the walls of the window opening, so as to fix the part of the clamping frame (14), protruding inside the window opening, between said support (3) and the closure (15) elements, as shown in FIG. 2.

On the step of installing the window assembly, between the protruding part of the clamping frame (14) and adjoining thereto surfaces of the sash framework (2) of the window assembly and of said support (3) and closure (15) elements, a layer of refractory material (16), preferably, of a mullite silica cardboard, is interposed, wherein said layer forms a thermal break therebetween. The last step of installation method consists in disposing a face multiple glass unit (1) on the sash so as to form therebetween a thermal break in the form of a refractory material layer. Like a clamping frame (14), the support (3) and the closure (15) elements are preferably made of pipe sections with rectangular cross-section, welded together.

Thus, the installation of the window assembly in the window opening according to the present invention is carried out through a mounting attachment formed by the hollow pipe elements (3, 14 and 15), where the layer (16) of the mullite silica cardboard of given thickness is laid therebetween. Said fastening characteristics ensure the effective dissipation of a part of explosion energy affecting the window assembly, firstly, due to the compression of the layer (16), and then due to the elastoplastic deformation of the pipe elements (3, 14 and 15).

Along with that, the present invention is not limited in terms of the type of the metallic elements used in the described window assembly and in its attachments. In particular, all the elements of the assembly, as previously described, being made of pipe sections with rectangular cross-section, may be formed, for example, from pipe sections with nonrectangular cross-section or may be solid. The choice of each of these elements is determined by desired characteristics for particular window assembly.

A window sample according to the present invention, installed in a test opening in accordance with the described installation method, passed the blast resistance test and withstood the load level Pf=1.1 kg/sm$^2$ (110 kPa) without formation of through openings and cracks, and without displacement when exploding the trinitrotoluene charge weighing 50 kg in a cube form on the ground surface from a distance of 14 m.

It should be noted that exemplary preferred embodiments of the present invention which have just been described, do not limit the scope of the present invention. Upon reading the present description the one skilled in the art may propose numerous modifications and supplements to the described embodiments, all of which would fall under the scope of patent protection defined by the appended claims of the invention.

The invention claimed is:

1. A fire-blast resistant window assembly comprising a sash to be built in a window opening, a glazing system and a face multiple glass unit covering the sash from a front side of the sash, characterized in that the face multiple glass unit is mounted on the sash so that a thermal break in the form of a thermal insulation material layer is formed therebetween;

the sash comprises a metallic framework with a face part and a back part, a surface of the metallic framework facing inside the window opening delimits a mounting aperture for the glazing system, wherein metallic separating plates are welded to the face part of the framework, along the perimeter of said mounting aperture, so as to provide spacings therebetween;

the glazing system contains a first and a second glazing unit, wherein a first glazing unit is installed in said mounting aperture in the face part of the metallic framework of the sash as a fixed leaf, and comprises:

a first metallic support contour made of a first angular profile, wherein a first flange of the first angular profile is welded to said separating plates and is directed inwards to a room, while a second flange of the first angular profile protrudes inside the mounting aperture, thereby forming a first support lug;

a first glazing sheet inserted on a back side of the first metallic support contour so that it abuts against said first support lug, and first metallic glazing beads fastened on a back side of the first glazing sheet by means of bolted connections to the flange welded to the separating plates so that the first glazing sheet is pressed to said first support lug, wherein a layer of a refractory material is interposed between the first glazing sheet and adjoining thereto surfaces of the first support lug and of the first metallic glazing beads of the first glazing unit, wherein said layer forms a thermal break therebetween;

the second glazing unit is installed in said mounting aperture in the back part of the metallic framework of the sash and comprises a second metallic support contour made of a second angular profile, wherein a first flange of the second angular profile protrudes inside the mounting aperture, thereby creating a second support lug, a second glazing sheet inserted with an abutment in said second support lug, and second metallic glazing beads pressing the second glazing sheet to said second metallic support contour, the first and second metallic glazing beads consisting of pipe sections with rectangular cross-section, wherein a layer of a refractory material is interposed between the second glazing sheet and adjoining thereto surfaces of the second metallic support contour and of glazing beads of the second glazing unit, wherein said layer forms a thermal break therebetween, and the second metallic support contour of the second glazing unit is fastened to the metallic framework of the sash by means of bolted connections so as to obtain a sealing between the sash and the second glazing unit.

2. The fire-blast resistant window assembly according to claim 1, wherein the refractory material in the first and second glazing units is mullite silica cardboard.

3. The fire-blast resistant window assembly according to claim 1, wherein the second metallic support contour of the second glazing unit is fastened to the sash framework using a separating element that is a metallic contour made of a third angular profile enveloping a corner of the metallic framework of the sash from the back part of the metallic framework of the sash, so that a flange of the third angular profile of said separating element is interposed between the second metallic support contour of the second glazing unit and the sash framework.

4. The fire-blast resistant window assembly according to claim 1, wherein the first and the second glazing sheets are made of multiple-layered glass.

5. The fire-blast resistant window assembly according to claim 1, wherein the metallic framework of the sash is made of pipe sections with rectangular cross-section.

6. A method for installing the fire-blast resistant window assembly according to claim 1 in the window opening, wherein the window opening has a groove with a metal casing provided along an inner perimeter of the window opening, said method comprising providing the fire-blast resistant window assembly according to claim 1:

inserting a metallic clamping frame in said groove so that a part of the metallic clamping frame protrudes inside the window opening;

welding a metallic support element to the back part of the metallic framework of the sash of the window assembly, the welding being performed from a surface of the metallic framework facing walls of the window opening;

installing the window assembly into the window opening so that said support element abuts against the part of the metallic clamping frame that protrudes inside the window opening, from a back side of the metallic support element; and welding a metallic closure element to the face part of the metallic framework of the sash of the window assembly, the welding being performed from the surface of the metallic framework facing the walls of the window opening so as to ensure fixation of the part of the metallic clamping frame that protrudes inside the window opening, between said metallic support element and a closure element, wherein a layer of refractory material is disposed between the protruding part of the metallic clamping frame and adjoining thereto surfaces of the window assembly and of said metallic support element and the closure element, wherein said layer forms a thermal break therebetween.

7. The method for installing according to claim 6, wherein said metallic support element, closure element, and the metallic clamping frame are made of pipe sections with rectangular cross-section.

* * * * *